United States Patent [19]

Atsumi

[11] 3,853,326

[45] Dec. 10, 1974

[54] TURNTABLE ARRANGEMENT WITH AUTOMATIC RECORD CHANGER SPINDLE

[75] Inventor: Tomoo Atsumi, Osaka, Japan

[73] Assignee: Matsushita Electric Industrial Co. Ltd., Osaka-fu, Japan

[22] Filed: Oct. 17, 1972

[21] Appl. No.: 300,420

[30] Foreign Application Priority Data

| | | |
|---|---|---|
| Oct. 21, 1971 | Japan | 46-83812 |
| Oct. 21, 1971 | Japan | 46-83813 |
| Oct. 25, 1971 | Japan | 46-84827 |
| Oct. 21, 1971 | Japan | 46-97830 |

[52] U.S. Cl. .......... 274/10 S

[51] Int. Cl. .......... G11b 17/04

[58] Field of Search .......... 274/10 S

[56] References Cited

UNITED STATES PATENTS

| | | | |
|---|---|---|---|
| 2,981,953 | 4/1961 | Hansen | 274/10 S |
| 3,371,935 | 3/1968 | Kieninger | 274/10 S |
| 3,432,170 | 3/1969 | Staar | 274/10 S |
| 3,603,598 | 9/1971 | Laufer | 274/10 S |
| 3,720,414 | 3/1973 | Igata | 274/10 S |

*Primary Examiner*—Louis R. Prince
*Assistant Examiner*—Steven L. Stephan
*Attorney, Agent, or Firm*—Wenderoth, Lind & Ponack

[57] ABSTRACT

A turntable arrangement with an automatic record changer spindle essentially comprising a primary support consisting of a plurality of supporting members radially outwardly projecting from the periphery of the spindle housing rather like the supporting struts of an umbrella and a secondary support consisting of a plurality of clamping members capable of radially outwardly projecting from the periphery of the spindle housing for supporting a stack of records mounted thereon except for the lowermost one of them which is supported by the supporting members. These primary and secondary supports are operated in response to movement of an inner hollow shaft which is slidably housed within the spindle housing and is effected by a pivotable operating element having a hook member.

4 Claims, 5 Drawing Figures

PATENTED DEC 10 1974

3,853,326

SHEET 1 OF 2

TURNTABLE ARRANGEMENT WITH AUTOMATIC RECORD CHANGER SPINDLE

Figure 4:
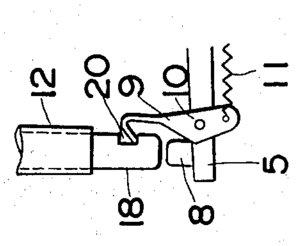

The present invention relates to a turntable arrangement for use in an automatic record player and, more particularly, to a record changer spindle of the type generally known as an umbrella spindle, for dropping a stack of records, which are to be played and are mounted thereon, one after another onto a turntable in a predetermined sequential manner and at known intervals.

In general, the record changer spindle of the type above referred to comprises a primary support consisting of a plurality of supporting members radially outwardly projecting from the periphery of the spindle housing rather like the supporting struts of an umbrella and a secondary support consisting of a plurality of clamping members capable of radially outwardly projecting from the periphery of the spindle housing. In practice, while one record is being played, the remainder of the stack of records mounted on said record changer spindle is supported on the primary support. When the next lowermost record in the stack is to be played, the secondary support comes into action and supports all the records in the stack except for the lowermost one. The primary support is then withdrawn within the spindle housing so that the lowermost record falls down the spindle and onto the turntable. The abovementioned sequential operation is carried out by a drive mechanism operatively associated in any known manner with the movement of a tone arm carrying the pickup stylus.

According to the present invention, an essential feature resides in that the drive mechanism for operating the primary and secondary supports within the spindle housing through an inner hollow shaft carrying thereon the primary support and a connecting rod operatively connected between said primary and secondary supports comprises a pivotable lever having an engaging member for downwardly pulling the inner hollow shaft thereby to permit the primary support to be withdrawn within the spindle housing while permitting the secondary support to be brought into the action. In this drive mechanism, if no record is mounted on the spindle and hence no load is imposed on the primary support, engagement between the engaging member on the pivotable lever, which is operatively associated with the movement of the tone arm, and the inner hollow shaft, which said engagement is required to downwardly pull said inner hollow shaft for the abovementioned purpose, will not occur.

Another important feature of the present invention resides in that the spindle housing is formed by curling a metal strip which has been previously formed with various necessary openings by a suitable perforating technique.

Other feature of the present invention resides in that a substantially U-shaped stopper is utilized for receiving therein a cap member closing the upper opening of the spindle housing and for holding an elastic member for normally downwardly urging a holding block for the clamping members in place within the spindle housing.

A further feature of the present invention resides in that the secondary support comprises the holding block having axially extending grooves for accommodating therein the clamping members, each of which is formed at an upper end with a lateral recess into which a lateral projection integrally formed in the corresponding clamping member is pivotally engaged with the body of said clamping member capable of being accommodated in the corresponding groove.

Figure 5:
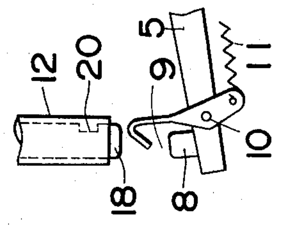
Figure 1:
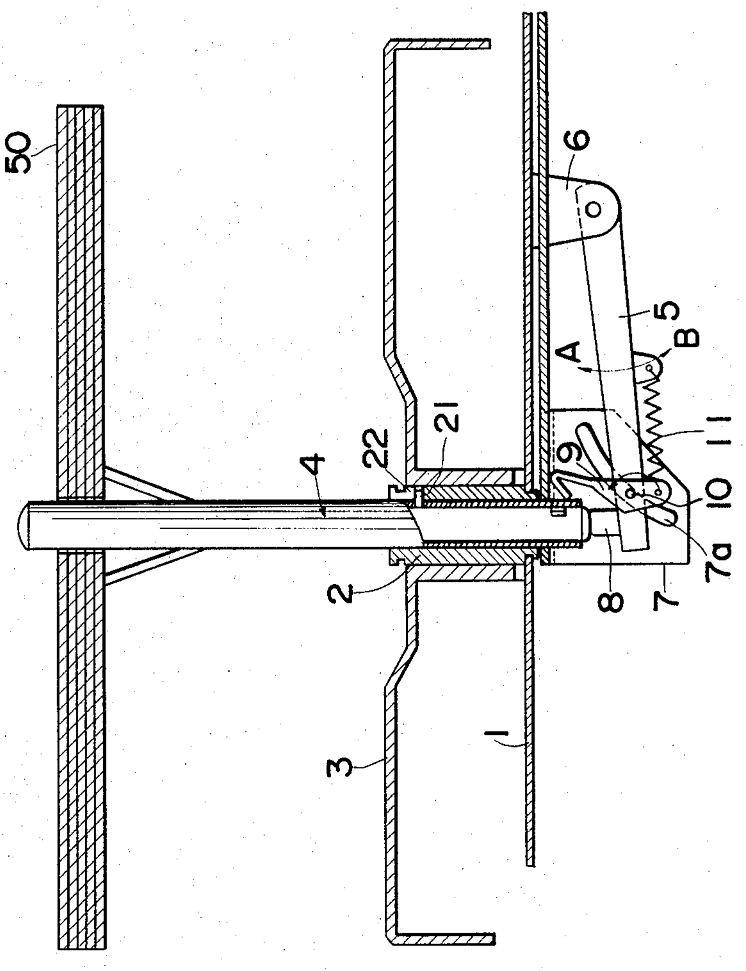
Figure 2:
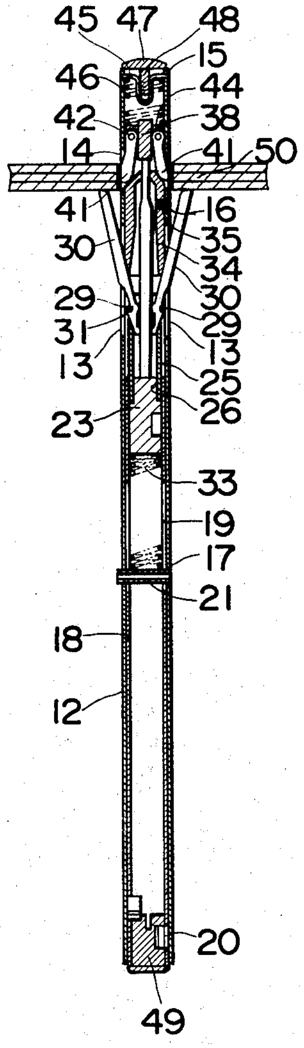
Figure 3:
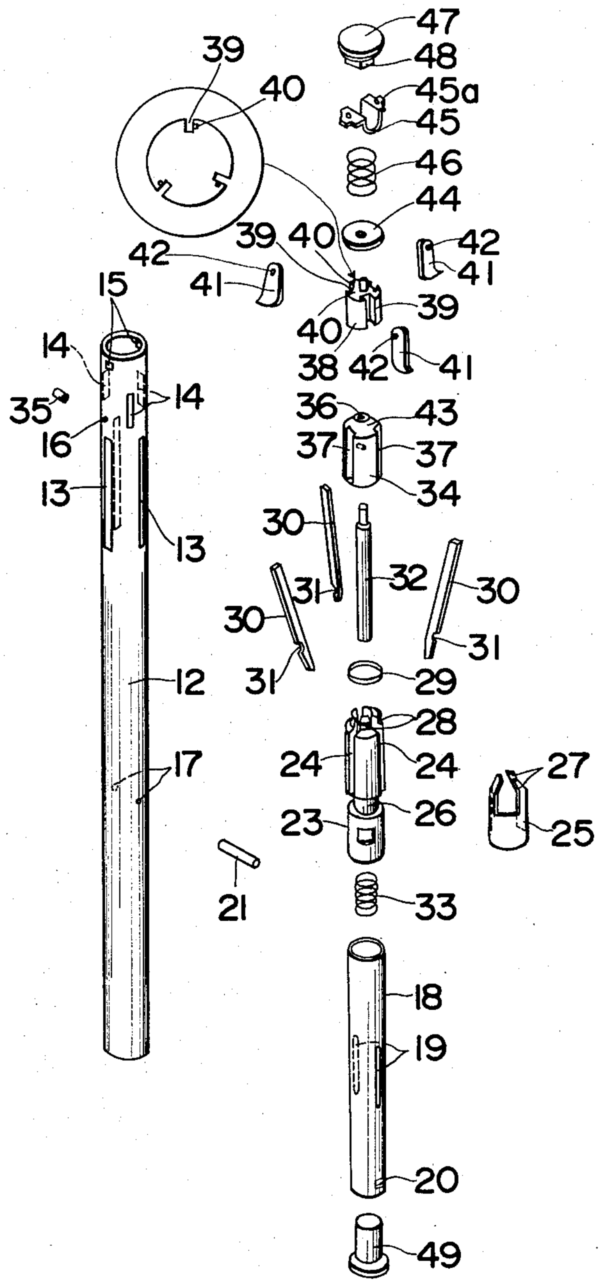

One example of the turntable arrangement having the record changer spindle constructed in accordance with the present invention is illustrated in the accompanying drawings, in which;

FIG. 1 is a schematic vertical sectional view of a turntable arrangement embodying the present invention, FIG. 2 is a vertical sectional view of a record changer spindle constructed in accordance with the present invention, FIG. 3 is an exploded view of the record changer spindle shown in FIG. 2, FIG. 4 is a schematic diagram showing a portion of a drive mechanism shown in FIG. 1, wherein a hook member engages with an inner hollow shaft, and FIG. 5 is a schematic diagram showing a portion of the drive mechanism shown in FIG. 1, wherein the hook member is shown as pivoted without engaging with the inner hollow shaft.

It is to be noted that, for facilitation of a better understanding of the present invention, like parts are designated by like reference numerals throughout the accompanying drawings.

A turntable arrangement for use in an automatic record player according to the present invention generally comprises, as shown in FIG. 1, a mounting panel 1, a sleeve 2 rigidly mounted on said mounting panel 1 and upwardly extending therefrom, a turntable 3 rotatably mounted on said sleeve 2 above the upper surface of said mounting panel 1, a record changer spindle 4 forming a part of the automatic record changer and adapted to carry a stack of records 50 to be played one after another, and a drive mechanism for operating internal mechanisms of said record changer spindle 4 to permit the records 50 to successively fall onto the rotating turntable 2 in any known manner.

The arrangement so far described may be of any conventional construction except for the details of the record changer spindle 4 and the drive mechanism associated therewith. In other words, the present invention is essentially directed to the details of the changer spindle 4 and the associated drive mechanism. However, the drive mechanism for operating the internal mechanisms of the record changer spindle 4 is closely related with the movement of a tone arm (not shown) of any known construction whereby the records on the changer spindle are successively fed onto the rotating turntable at known intervals and in a known sequential mode of operation with respect to the movement of the tone arm. As will be described later, the drive mechanism herein employed is designed to be operated in response to the movement of a drive plate operatively associated with the tone arm, the arrangement of said drive plate in association with the tone arm being disclosed heretofore in various patents. Accordingly, for the sake of brevity, description of the operational mode of the drive mechanism in association with the tone arm through the drive plate is herein omitted.

Referring still to FIG. 1, the drive mechanism for operating the internal mechanisms of the record changer spindle 4 is provided below the undersurface of the mounting panel 1 and comprises an operating lever 5 having one end pivotally connected through a bracket 6 with the undersurface of the mounting panel 1 and pivotable in the manner as will be mentioned later, and the other end rigidly mounted with a presser piece 8 projecting toward and aligned with the longitudinal axis of the changer spindle 4. Adjacent to the presser piece 8, the lever 5 carries a hook member 9 pivotally mounted on said lever 5 by means of a pin 10 and normally biased in the counterclockwise direction toward the changer spindle 4 by a compression spring 11 disposed between said member 9 and a substantially intermediate portion of said lever 5.

The drive mechanism further comprises at least one guide plate 7 rigidly suspended from the drive plate and having a guide slot 7*a* through which the pin 10 slidably extends. This guide slot 7*a* is curved such that the reciprocal movement of the drive plate brings about a pivotal movement of the operating lever 5 about its pivot with the pin 10 guided along the guide slot 7*a*. The functions of the presser piece 8 and the hook member 9 which are originated from the pivotal movement of the operating lever 5 will be clearly understood later. It is to be noted that the guide plate 7 having the guide slot 7*a* may be provided on both sides of the hook member 9 with the both ends of said pin 10 arranged to slidably engage in the guide slots, thereby to avoid a possible displacement of the presser piece 8 from its alignment with the longitudinal axis of the changer spindle 4.

Referring now to FIGS. 2 and 3 in which the details of the changer spindle 4 are shown, the record changer spindle 4 comprises an elongated tubular housing 12 formed with at least three elongated slots 13 for record supporting members 30, at least three short slots 14 for record clamping members 41, a pair of opposed engagement holes 15 for retaining a socket 45 within said tubular housing 12, a circular opening 16, and a pair of circular openings 17. These various openings are formed in the tubular housing 12 in a predetermined arrangement by means of a suitable perforating technique when the tubular housing is in the form of a metal strip, i.e., prior to the housing being curled into the tubular shape.

The spindle housing 12 includes a hollow shaft 18 formed at a substantially intermediate portion with a pair of opposed slits 19 and at a lower end portion with a transversely rectangular opening 20 for engagement with the hook member 9. This hollow shaft 18 with the various openings 19 and 20 may be formed by the same method as employed in the manufacture of the tubular housing 12. The hollow shaft 18 is slidably housed within the spindle housing 12, the stroke of sliding movement thereof being restricted by the slits 19 in cooperation with a pin member 21 rigidly extending between the circular openings 17 across the hollow shaft 18 through the slits 19. As clearly shown in FIG. 2, the pin member 21 has one end flush with the outer peripheral surface of said spindle housing 12 and the other end slightly projecting outwards from said outer peripheral surface thereof, the projected portion of said pin member 21 being adapted to engage in a key groove 22, formed in the outer peripheral surface of said sleeve 2 as shown in FIG. 1, for firmly holding the spindle 4 in position in axial alignment with the sleeve 2 and hence the turntable 3 while said spindle 4 is inserted through the sleeve 2 so as to permit a lower end portion of said spindle 4 to downwardly project a predetermined distance from the plane of the undersurface of the mounting panel 1.

The hollow shaft 18 carries a holder block 23 having a lower end fixedly inserted in the hollow of said shaft 18 at the upper end thereof and the other upper end being made hollow and formed with three axially extending notches 24. This holder block 23 is formed at a substantially intermediate portion with a reduced diameter portion 26 which receives a curled spring member 25 and holds it in place in such a manner that spring tongues 27 integrally formed with said spring member 25 and normally biased in the radially inward direction with respect to one another are entrapped in the respective notches 24.

The holder block 23 is also formed with an annular groove 28 on which an annular ring 29 is mounted. This annular ring 29 serves not only to restrict the radially outward displacement of the segments of the upper portion of the holder block 23 which are formed by the provision of the axially extending notches 24 dividing said upper portion of said holder block 23 into such segments, but also to pivotally retain the record supporting members 30 in a manner as will be described later.

Each of the record supporting members 30 is of a thickness slightly smaller than the size of the corresponding notch 24 and is formed at a lower portion a notch 31 which engages with the annular ring 29 when it is inserted in the hollow of the upper portion of the holder block 23. The hollow of the upper portion of the holder block 23 receives therein a pusher rod 32 with said supporting members 30 surrounding said rod 32, upper portions of said supporting members 30 being radially outwardly expanded by the spring tongues 27 respectively in elastic engagement with the lower ends of said supporting members 30 as shown. The radially outwardly expanded ends of the supporting members 30 extend through the elongated slots 13, respectively, to support the record stack 50 thereon. It is to be noted that the pusher rod 32 does not function as will be mentioned later, but also acts to force the supporting members 30 to engage through the respective notches 31 with the annular ring 29 about which said supporting members 30 pivot.

A compression spring 33 is loosely housed within the hollow shaft 18 in the spindle housing 12 between the pin member 21 and the lower end face of the holder block 23 so that said hollow shaft 18 is normally upwardly biased by said compression spring 33 within the spindle housing 12 with the upper ends of the supporting members 30 outwardly projecting through the respective elongated slots 13.

The spindle housing 12 includes a stationary boss 34 fixedly held within said spindle housing 12 above the holder block 23. This stationary boss 34 is formed with a through hole 36 in alignment with the longitudinal axis of said boss 34 for slidably supporting an upper end portion of said pusher rod 32 and with three grooves 37 on the outer peripheral surface for accommodating the upper end portions of the supporting members 30 as will be mentioned later. Fixture of the stationary boss 34 within the spindle housing 12 may be performed by inserting a pin 35 through the circular opening 16 into a rigid portion of said stationary boss 34. At this time, care must be taken that the axially extending grooves 37 be respectively registered with the elongated slots 13. Preferably, the stationary boss 34 has an upper end made round or tapered for the reason as will become apparent from a later description.

The spindle housing 12 further includes another holder block 38 for the clamping members 41 and loosely disposed within said spindle housing 12 above the stationary boss 34. This holder block 38 is formed on its peripheral surface with three axially extending grooves 39, each of which is formed at its upper end with a lateral recess 40 as clearly shown in the enlarged portion of FIG. 3 showing the top plan view of the holder block 38. Each of the axially extending grooves 39 on the holder block 38 is adapted to accommodate therein the clamping member 41 with a lateral projection 42 of said clamping member 41 pivotally engaged in the corresponding lateral recess 40, so that the clamping members 41 can be radially outwardly expanded with lower ends of said members 41 in sliding engagement with the rounded end of the stationary boss 34 as said holder block 38 is downwardly moved in a manner which will be described later. As clearly shown in FIG. 2, the lower ends of the clamping members 41 with the holder block 38 in a lowered position project outwardly through the respective short slots 14 and steadily hold the records 50 in place except for the lowermost member of said records which is ready to fall on to the rotating turntable 3 as will become clear from description of the operation of the turntable arrangement of the present invention. In any event, it is to be noted that the upper tip of each of the clamping members 41 must be situated in the plane substantially flush with or slightly lower than the upper end face of the holder block 38, or otherwise the pivotal movement of each of said clamping members 41 will be hampered by a part mounted on the upper end face of said holder block 38.

A compression spring 46 of relatively high resiliency is utilized to maintain the holder block 38 for the clamping members 41 in the normally downwardly urged position, i.e., the lowered position, to permit the lower ends of said clamping members 41 to radially outwardly project through the associated short slots 14. This compression spring 46 has a lower end mounted on the upper end face of the holder block 38 through a washer 44 interposed therebetween and the other end abutted against the socket 45 which concurrently serves as a stopper for the compression spring 46.

The socket 45 is of a substantially U-shape and has a pair of lateral wings 45*a* extending integrally from upper ends of the U-shaped portion thereof in the opposite directions. These wings 45*a* are adapted to fit into the engagement holes 15 in the spindle housing 12 from the inside of said housing 12 with the U-shaped portion of said socket 45 received in the upper end portion of said compression spring 46 while maintaining said compression spring 46 in a compressed condition. This socket 45 can be easily inserted and held in place within the spindle housing 12 because of its particular shape. In spite of the fact that the compression spring 46 is of relatively high resiliency, it can be inserted in the spindle housing 12 in such a way that the U-shaped portion is elastically deformed to permit the opposed wings 45*a* to approach to each other while compressing the compression spring 46. The wings 45*a* of the socket 45 are then engaged in the respective holes 15 of the spindle housing 12 by the effect of resiliency of the U-shaped portion which tends to restore it to the original shape.

The cap member 47 of a diameter equal to the outer diameter of the tubular housing 12 is on its undersurface formed with a downwardly projecting engagement 48 which fits into the U-shaped portion of the socket 45. It is to be noted that the engagement 48 integral with the cap member 47 must be of substantially the same size as the size of a space defined by the U-shaped portion of the socket 45 whereby a possible deformation of the socket 45 to an extent that the wings 45*a* of said socket 45 disengage from the respective engagement holes 15 which may result from the high resiliency of the compression spring 46 can be advantageously prevented.

The washer 44 interposed between the upper end face of the holder block 38 and the lower end of the compression spring 46 may be omitted if the diameter of the compression spring 46 is sufficient to permit the lower end of said compression spring 46 overhang the tip of each of the clamping members 41. However, the employment of the washer 44 is advantageous in that an end of a wire forming the compression spring 46 can be prevented from arbitrarily entering one of the grooves 39 and in that escapement of any one or all of the clamping members 41 from the holder block 38 can be also prevented.

Reference numeral 49 represents a closure member for closing the opening at the lower end extremity of the hollow shaft 18 and for engagement with the presser piece 8 of the drive mechanism.

In the condition as shown in FIG. 1 wherein the drive plate is moved to the left and the presser piece 8 is in the upwardly shifted position in engagement with the closure member 49 at the lower end extremity of the hollow shaft 18, thus slightly upwardly shifting the hollow shaft 18 within the spindle housing 12, while the operating lever 5 is pivoted to the direction as indicated by the arrow A, the pusher rod 32 is accordingly in the elevated position with its tip pressing the holder block 38 for the clamping members 41 against the compression spring 46, thus forming a corresponding clearance between the tip of the rounded end 43 of the stationary boss 34 and the lower end face of the holder block 38. At this time, the lower ends of the clamping members 41 are innerwardly retracted by upper edges of the respective short slots 14 while the upper end portions of the supporting members 30 are outwardly projected through the respective elongated slots 13.

A similar condition to the foregoing can be observed when the spindle 4 is removed from the sleeve 2 with the exception that the holder block 38 is downwardly urged by the compression spring 46 whereby the lower ends of the respective clamping members 41 is outwardly projected through the short slots 14 in contact with the rounded end 43 of the stationary boss 34. while said holder block 38 compresses the compression spring 33 which is of resiliency smaller than that of the compression spring 46.

In practice, the turntable arrangement according to the present invention functions as follows. Assuming that the various parts of the drive mechanism for operating the changer spindle 4 are conditioned as shown in FIG. 1 and that the stack of records 50 are mounted on the changer spindle 4, the record stack rests on the tips of the respective supporting members 30 then radially outwardly expanded outside the elongated slots 13 of the spindle housing 12. In spite of the fact that, at the time the records are mounted on the spindle 4 in the vertically stacked position, the total weight of the records 50 acts on the supporting members 30 which tends to press said supporting members 30 and hence the hollow shaft 18 in the downward direction, actual downward displacement of the supporting members 30 and hence the hollow shaft 18 due to the weight of the stacked records 50 does not occur due to restriction by the presser piece 8 in its upwardly shifted position in engagement with the closure member 49 and hence the lower end extremity of the hollow shaft 18 as hereinbefore described.

As the drive plate moves toward the left causing the operating lever 5 to pivot in the opposite direction as indicated by the arrow B in the manner as hereinbefore described, the presser piece 8 descends. As said presser piece 8 descends, the compression spring 46 that has been compressed expands to bring the holder block 38 for the clamping members 41 to the lowered position, the downward movement of said holder block 38 being in turn transmitted to the hollow shaft 18 through the pusher rod 32 and then the holder block 23 for the supporting members 30. As the hollow shaft 18 downwardly moves with the closure member 49 in contact with the presser piece 8 which is then downwardly shifted in accodance with the pivotal movement of the operating lever 5 in the direction B, the rectangular opening 20 is exposed outside the spindle housing 12 into which the tip of the hook member 9 tending to pivot about the pin 10 by the action of the tension spring 11 is subsequently engaged, as shown in FIG. 4.

Neither the engagement between the rectangular opening 20 and the tip of the hook member 9 nor the exposure of the rectangular opening 20 outside the spindle housing 12 will occur if no record is mounted on the spindle 4. This is because, as shown in FIG. 5, the supporting members 30 receive no load and, hence, the hollow shaft 18 within the spindle housing 12 does not descend even through the presser piece 8 is downwardly shifted accompanied by the pivotal movement of the operating lever in the direction B. In other words, the compression spring 33 housed within the hollow shaft 18 is of a resiliency sufficient so as to be compressed by the load imposed on the tips of the respective supporting members 30 to an extent that the rectangular opening 20 in the hollow shaft 18 can be exposed outside the spindle housing 12 to permit the tip of the hook member 9 to engage in said opening 20.

Prior to the downward movement of the hollow shaft 18 effected by the external load imposed by the record stack 50 and transmitted through the supporting members 30 and then the holder block 23, the various parts, i.e., internal mechanisms, of the changer spindle 4 are conditioned as shown in FIG. 2. In this condition, as hereinbefore described, the holder block 38 for the clamping members 41 is upwardly shifted by the pusher rod 32 with the hollow shaft 18 in the upwardly shifted position, in which condition, while the supporting members 30 are radially outwardly expanded by the spring tongue 27 through the elongated slots 13 thereby to support the stack of records 50 thereon, the clamping members 41 are radially inwardly retracted within the spindle housing 12. The downward shift of the presser piece 8 in accordance with the pivotal movement of the operating lever 5 in the direction B accompanies a corresponding downward movement of each of the hollow shaft 18 and the pusher rod 32 and, consequently, the holder block 38 for the clamping members 41 is downwardly urged by the compression spring 46. During the downward movement of the holder block 38, the lower end portions of the clamping members 41 are in sliding engagement with the rounded end 43 of the stationary boss 34 pivoting about the respective projections 42 thereof and thus tending to radially outwardly expand through the short slots 14. Simultaneously therewith, the hollow shaft 18 and hence the supporting members 30 descends with their tips in contact with the undersurface of the lowermost member of the records 50 mounted on the spindle 4.

From the foregoing, it has now become clear that the other records except for the lowermost member thereof which is in contact with the tips of the supporting members 30 are suspended by the then radially outwardly expanded clamping members 41 in such a way that each central hole of the records except for the lowermost one receives a radially outwardly acting force which is transmitted by the compression spring 46 through the clamping members 41 then radially outwardly expanded in cooperation with the rounded end 43 of the stationary boss 34.

The supporting members 30 upon receipt of the weight of the lowermost record which has been separated from the others without being clamped by the clamping members 41 descends against the compression spring 33 causing the rectangular opening 20 at the lower end of the hollow shaft 18 to emerge from the lower end extremity of the spindle housing 12. Immediately after the rectangular opening 20 of the hollow shaft 18 has been exposed to the outside of the spindle housing 12, the tip of the hook member 9 that has been in sliding engagement with the outer peripheral surface of the spindle housing 12 while tending to pivot in the counterclockwise direction by the action of the tension spring 11 is engaged in said rectangular opening 20, whereby said hollow shaft 18 can be thereafter pulled downwardly by said hook member 9 being then downwardly shifted in accordance with the pivotal movement of the operating lever 5, thus establishing the condition as shown in FIG. 4.

During a period in which the hollow shaft 18 is downwardly pulled by the hook member 9 in engagement with the rectangular opening 20 in the manner as hereinbefore described, the supporting members 30 are radially inwardly moved with edge portions thereof adjacent to the annular ring 29 being respectively slidably engaged by the lower edges of the corresponding elongated slots 13. At the time the hollow shaft 18 completes its downward movement in which condition the operating lever 5 no longer pivots in the direction B the supporting members 30 has been completely housed within the spindle housing 12 and, consequently, the lowermost record is permitted to fall by gravity on to the rotating turntable 3.

Subsequent to a return movement of the drive plate causing the operating lever 5 to pivot in the opposite direction as indicated by the arrow A, the tip of the hook member 9 disengages from the rectangular opening 20 of the hollow shaft 18 so that the hollow shaft 18 can be thereafter upwardly shifted by the compression spring 33. During this upward shift of the hollow shaft 18, the supporting members 30 gradually expand by the action of the spring tongues 27 in the radially outward direction while pivoting about the annular ring 29, thereby to establish the initial condition to support the next lowermost one of the remaining records in the stack. Simultaneously therewith, the pusher rod 32 elevates against the compression spring 46 with its tip pushing the holder block 38 whereby the clamping members 41 are radially inwardly retracted by the engagement with the upper edges of the respective short slots 14, thus completing one cycle of the operation of the changer spindle 4 constructed in accordance with the present invention.

Removal of the whole number of the records 50 that have been stacked on the turntable 3 can be practised in a similar way as has been heretofore practised. This is because, when the record player mounted with the changer spindle 4 of the present invention is in the inoperative position, the holder block 38 for the clamping member 41 is in the elevated position and consequently the clamping member 41 are housed within the spindle housing 12 without obstructing the passage of the records to be removed through the changer spindle 4.

The present invention has been fully disclosed by way of the preferred embodiment thereof. However, it is to be noted that various changes and modifications thereof are apparent to those skilled in the art from the foregoing description with or without reference to the accompanying drawings. For example, the lateral projection 42 of each of said clamping members 41 is preferably formed by a suitable press technique or a blanking method, is said clamping members are made of metallic material. In addition, each of the clamping members 41 may be provided at its lowermost tip with a transversely extending knife edge which, when said clamping member is radially outwardly expanded, engages in between the two adjacent records. Furthermore, the holder block 23 and the spring member 25 with the spring tongue 27 may be integrally formed, in which case the both elements are preferably made of synthetic material having a sufficient elasticity. Therefore, these and other changes and modifications should be construed as included within the scope of the present invention unless otherwise departing therefrom.

What is claimed is:

1. A record changer spindle, comprising:

a spindle housing of tubular shape and having a plurality of apertures therein;

an inner hollow shaft;

means positioned within said spindle housing and operable in response to the sliding movement of said inner hollow shaft for alternately clamping and releasing a stack of records mounted on said spindle, said inner hollow shaft positioned within said housing and slidable between upper and lower positions, said shaft being coupled to said clamping and releasing means and having an engagement hole formed adjacent a lower end portion thereof, the position of the engagement hole being selected for being withdrawn into said housing when said inner shaft assumes its upper position and extending below said housing when said shaft assumes an intermediate position; and means positioned adjacent the lower portion of said spindle housing, said means comprised of a lever member, one end thereof being pivotally mounted and the other end being positioned beneath said spindle housing and adapted to move between upper and lower positions, said lever member normally assuming said upper position, an upwardly projecting support member positioned on said lever member adjacent the free end thereof and adapted to contact said inner hollow shaft for support thereof when said lever member is in the upper position, a hook member pivotally mounted on said lever member adjacent said support member, said hook member extending upwardly from said lever member, and a spring member operatively coupled to said hook member for biasing said hook member toward said support member, said hook member thereby contacting the lower portion of said housing when said lever assumes its upper position, whereby downwardly pivoting said lever member terminates support of said inner shaft by said support member and said shaft moves downwardly and, when records are being supported, said shaft moves downwardly to said intermediate position such that said engagement hole extends from said housing, said hook member thereby engages said engagement hole and further downwardly moves said shaft and consequently operates said clamping and releasing means, whereby the lowermost record may be released from the stack.

2. A record changer spindle as recited in claim 1 wherein said housing is comprised of a curled metal strip having an upper end portion formed with at least three elongated and three short slots each extending in parallel to the longitudinal axis of said spindle housing; said means for alternatively clamping and releasing being comprised of a first holder block mounted on an upper end of said inner hollow shaft within said spindle housing, supporting members having a lower end portion pivotally carried by said first holder block and an upper end portion diagonally outwardly extending through the corresponding ones of said elongated slots in said spindle housing for supporting a stack of records mounted on said spindle, a compression spring positioned within said housing for upwardly urging said inner hollow shaft with said first holder block thereby causing said supporting members to radially outwardly expand through said elongated slots in said spindle housing, a stationary block fixedly housed within said spindle housing at a position substantially between said elongated slots and said short slots, a second holder block slidably housed within said spindle housing above said stationary block, clamping members having an upper end portion pivotally carried by said second holder block and a lower end portion adapted to substantially radially outwardly extend through the corresponding one of said short slots in said spindle housing for supporting the records in the stack except for the lowermost one of them only when said second holder block is downwardly shifted, a second compression spring for downwardly urging said second holder block thereby causing said clamping member to radially outwardly expand through said short slots in said spindle housing, and a connecting rod disposed between said first and second holder blocks through said stationary block.

3. A record changer spindle, comprising:

a spindle housing of tubular shape and having a plurality of apertures therein;

a first record support means slidably positioned within said housing for movement between upper and lower positions and portions thereof adapted to extend out of said housing through some of said apertures for supporting a stack of records when in the upper position and adapted to withdraw said portions into said housing to allow records to descend when in the lower postion;

a second record support means slidably positioned within said housing for movement between upper and lower positions and portions thereof adapted to extend out of said housing through some of said apertures when in the lower position, all but the lowermost record in the stack being thereby supported, said portions of said second record support means adapted to be withdrawn into said housing when in the upper position;

means positioned within said housing for downwardly biasing said second record support member;

connecting means operatively connecting said first and second record support members for simultaneous movement of said members;

an inner hollow shaft positioned within said housing and slidable between upper and lower positions, said shaft being coupled to one of said support means and having an engagement hole formed adjacent a lower end portion thereof, the position of the engagement hole being selected for being withdrawn into said housing when said inner shaft assumes its upper position and extending below said housing when said shaft assumes an intermediate position; and means positioned adjacent the lower portion of said spindle housing, said means comprised of a lever member, one end thereof being pivotally mounted and the other end being positioned beneath said spindle housing and adapted to move between upper and lower positions, said lever member normally assuming said upper position, an upwardly projecting support member positioned on said lever member adjacent the free end thereof and adapted to contact said inner hollow shaft for support thereof when said lever member is in the upper position, a hook member pivotally mounted on said lever member adjacent said support member, said hook member extending upwardly from said lever member, and a spring member operatively coupled to said hook member for biasing said hook member toward said support member, said hook member thereby contacting the lower portion of said housing when said lever assumes its upper position, whereby downwardly pivoting said lever member terminates support of said inner shaft by said support member and said shaft moves downwardly and, when records are being supported, said shaft moves downwardly to said intermediate position such that said engagement hole extends from said housing, said hook member thereby engaging said engagement hole and further downwardly moving said shaft and consequently said first and second support means, whereby the lowermost record may be released from the stack.

4. A record changer spindle as recited in claim 3 wherein the apertures of said housing are a plurality of short and long slots therein, said first record support means being comprised of a first holder block movable within said spindle housing, said portions thereof comprised of a plurality of supporting members pivotally carried by said first holder block and adopted for projecting diagonally radially outwardly through a corresponding number of said long slots formed in said spindle housing, said supporting members being outwardly projected for supporting thereon a stack of records, said second record support means being comprised of a second holder block movable within said spindle housing in association with said first holder block for said supporting members, and said portions thereof comprised of a plurality of clamping members pivotally carried by said second holder block and having the tip portions thereof adapted for radially outwardly projecting through the corresponding number of said short slots formed in said spindle housing, said clamping members being outwardly projected for retaining the records in the stack, except for the lowermost one of them.

* * * * *